(12) United States Patent
Sander

(10) Patent No.: US 8,487,989 B2
(45) Date of Patent: Jul. 16, 2013

(54) IMAGE STABILIZATION AND CAPTURE DEVICE FOR AN IMAGE CAPTURE SYSTEM OF A SURGICAL MICROSCOPE

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 13/187,579

(22) Filed: Jul. 21, 2011

(65) Prior Publication Data
US 2012/0026312 A1 Feb. 2, 2012

(30) Foreign Application Priority Data
Jul. 28, 2010 (DE) .......................... 10 2010 038 547

(51) Int. Cl.
*H04N 7/18* (2006.01)
(52) U.S. Cl.
USPC ................. 348/79; 348/80; 348/77; 359/368; 359/384
(58) Field of Classification Search
USPC .......................... 348/79, 80, 77; 359/368, 384
See application file for complete search history.

(56) References Cited

U.S. PATENT DOCUMENTS

| | | | |
|---|---|---|---|
| 5,786,936 A | 7/1998 | Baumann et al. | |
| 6,634,749 B1 * | 10/2003 | Morrison et al. | 351/209 |
| 7,504,608 B2 | 3/2009 | Klein | |
| 7,633,676 B2 * | 12/2009 | Brunner et al. | 359/369 |
| 8,179,597 B2 * | 5/2012 | Namba et al. | 359/383 |
| 2004/0119857 A1 * | 6/2004 | Loew et al. | 348/246 |
| 2004/0160654 A1 | 8/2004 | Pfefferseder et al. | |
| 2004/0160667 A1 | 8/2004 | Sander | |
| 2007/0002149 A1 * | 1/2007 | Oda | 348/222.1 |
| 2007/0171284 A1 | 7/2007 | Posamentier | |
| 2007/0262232 A1 | 11/2007 | Sander | |
| 2008/0204864 A1 * | 8/2008 | Sander | 359/368 |

FOREIGN PATENT DOCUMENTS

| | | |
|---|---|---|
| DE | 101 16 723 | 10/2002 |
| DE | 103 06 440 | 8/2004 |
| DE | 43 42 717 | 5/2005 |
| DE | 10 2006 040 636 | 12/2007 |
| WO | 97/12483 | 4/1997 |
| WO | 97/12483 A1 | 4/1997 |
| WO | WO 97/12483 * | 4/1997 |

OTHER PUBLICATIONS

Dudley, Dana and Dunn, Cheraina: "DLP technology—not just for projectors and TVs", Photonik International 2006, pp. 98-101, originally published in German in Photonik Jan. 2005.

* cited by examiner

*Primary Examiner* — Shawn An
(74) *Attorney, Agent, or Firm* — Hodgson Russ LLP

(57) ABSTRACT

The present invention relates to an image stabilization device which is particularly space-efficient and has a quick response time, and which is integrated into an image capture device for an image capture system of a surgical microscope, including a carrier substrate (101, 102) defining a sensor plane, a plurality of optoelectronic image capturing cells (110) arranged, in particular, in a matrix array; and at least one moving means (120) for moving the optoelectronic image capturing cells (110) relative to the carrier substrate (101, 102).

9 Claims, 3 Drawing Sheets

IMAGE STABILIZATION AND CAPTURE DEVICE FOR AN IMAGE CAPTURE SYSTEM OF A SURGICAL MICROSCOPE

CROSS REFERENCE TO RELATED APPLICATIONS

This application claims priority of German patent application number 10 2010 038 547.6 filed Jul. 28, 2010, the entire disclosure of which is incorporated by reference herein.

FIELD OF THE INVENTION

The present invention relates to an image stabilization and capture device for an image capture system of a surgical microscope, and to an image capture system and a surgical microscope having such an image stabilization and capture device.

BACKGROUND OF THE INVENTION

Surgical microscopes frequently have a plurality of observation beam paths, allowing the surgical field to be viewed both by the surgeon and an assistant, for example, and also to be made available to an image capture system, such as a camera. The camera is used to display the surgical field on a video screen and/or to document the surgery. When using the microscope and its features, such as XY adjustment, zoom adjustment, release of the brakes in the articulated arms, or as a result of external vibrations caused, for example, by passing vehicles or air conditioning systems having inadequate vibration isolation, the microscope may be caused to vibrate, resulting in a visible unsteadiness of the captured microscope image. These vibrations should be minimized, or preferably completely avoided.

German Patent Application DE 103 06 440 A1, for example, describes a stand having an Actively Reacting Flexible Structure (so called ARES) component for damping vibrations. In this approach, actuators are driven in response to detected vibrations in such a way that the microscope remains substantially steady. A similar system is known from in DE 4 342 717 B4.

In the field of still cameras, image stabilization devices are known where the optoelectronic image sensor is mounted in a special holder, which is provided with actuators for moving the sensor in the XY plane (image plane) to compensate for vibrations.

In prior art approaches, besides an acceleration-sensing system, it is also necessary to use components for moving the respective elements, such as lenses, sensors, mechanisms, etc., by means of actuators, control elements, motors, transmissions, etc. This requires a high degree of complexity and positioning accuracy and a large amount of space, and the inertia involved is too high for some vibrations.

It is, therefore, desirable to provide an image stabilization device for an image capture system of a surgical microscope, which device is particularly space-efficient and preferably has a quick response time.

SUMMARY OF THE INVENTION

According to the present invention, an image stabilization and capture device for an image capture system of a surgical microscope is provided.

Image stabilization involves reducing or eliminating relative motion between the image sensor and the image. In conventional image capture systems, this is done by moving either a lens or the sensor in directions opposite to the detected vibrations so as to keep the image stationary relative to the sensor. The inventor has discovered that, particularly for small vibrations, it is sufficient to move only the light-sensitive regions; i.e., the pixels of the sensor, while the actual sensor; i.e., the substrate, remains stationary. In other words, the image stabilization device is integrated into the image capture device. The substrate carries e.g. control circuits, power stages, voltage converters, charge pumps, storage means, I/O-interfaces etc.

Thus, the mass to be moved can be significantly reduced, so that less power and fewer components are needed and the space requirement is reduced. Since the masses to be moved are very small, the output signals of acceleration sensors may in certain cases already be sufficient for control purposes without having to interpose complex power stages. Possibly, it may be necessary to adapt the signal levels. In this manner, it is also possible to reduce the response time.

Provision may be made to simultaneously move all optoelectronic image capturing cells (light-sensitive cells, pixels) of the image stabilization and capture device or, if configured separately, to move each image capturing cell individually. Movement is imparted by suitable moving means, which, in a preferred embodiment, serve also as supporting means.

Moving means may be provided for one, two or three spatial directions. Depending on the design, vibration compensation may then be possible in the X, Y and/or Z directions. Preferably, moving means are provided to move all or individual image capturing cells in the XY plane (image or sensor plane). Alternatively, or in addition, it is preferred to provide moving means for moving all or individual image capturing cells in the Z direction (depth of field). Moving means for the Z direction not only make it possible to damp vibrations in this direction, but, particularly advantageously, also to form a wavefront which may be shaped to correct for aberrations, in particular spherical or non-spherical aberrations. Moreover, it is possible to compensate for tilts and/or irregularities in the plane of the object, which would normally be beyond the depth of field. For example, during retinal examination, this particularly advantageously enables sharp imaging of even far peripheral regions.

The moving means can include piezoelectric actuators, EAP actuators, thermal actuators, capacitive actuators, etc. A particularly suitable group of actuators are the EAP actuators, which are made of electroactive polymers (EAP). Electroactive polymers change shape when a voltage is applied. They are also referred to as "artificial muscles". Electroactive polymers can achieve high strains (of over 300%). They have a low density and are almost freely deformable.

Further advantages and embodiments of the present invention will become apparent from the following description and the accompanying drawings.

It will be understood that the aforementioned features and those described below can be used not only in the specified combinations, but also in other combinations or alone without departing from the scope of the present invention.

The present invention is schematically illustrated in the drawing by way of exemplary embodiments, and will be described below in detail with reference to the drawing.

BRIEF DESCRIPTION OF THE DRAWINGS

Elements having the same design or function are identified by the same reference numerals throughout the figures.

DETAILED DESCRIPTION OF THE INVENTION

Figure 1:
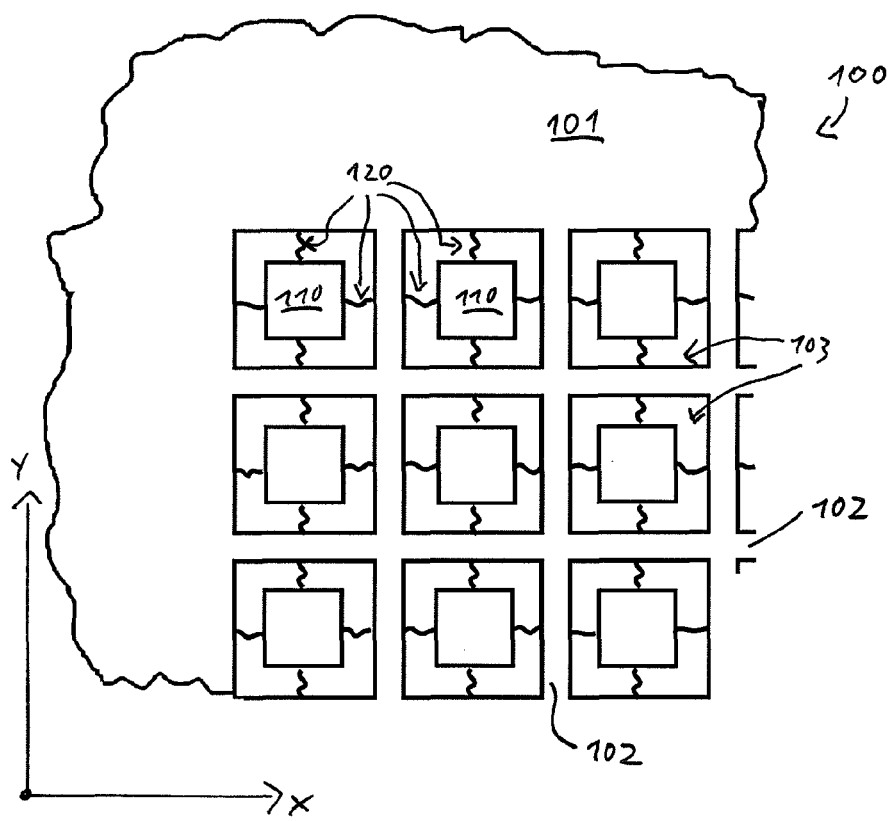
FIG. 1 is a schematic top view of a first preferred embodiment of an image stabilization device according to the present invention.

In FIG. 1, a first preferred embodiment of an image stabilization and capture device according to the present invention is shown in schematic top view and denoted as a whole by 100. Here, the image stabilization and capture device is in the form of an image-stabilized, optoelectronic image sensor 100 having a number of light-sensitive cells 110 arranged in an array. The image sensor may in particular be a CCD sensor or a CMOS sensor. The capture and generation of images by such sensors is known to those skilled in the art and, therefore, will not be discussed in greater detail herein.

Image sensor 100 includes a more or less large substrate portion 101, which is adapted for supporting and contacting the light-sensitive cells and for connecting the image sensor to further elements. In the present example, substrate 101 includes a grid-shaped portion formed by horizontal and vertical substrate strips 102. Substrate strips 102 define openings 103, each having one light-sensitive cell 110 disposed therein.

In the here shown embodiment of the present invention, light-sensitive cells 110 are attached in the X and Y directions by at least one moving means 120 to the surrounding substrate; i.e. to the adjoining substrate strip. This allows all light-sensitive cells 110 to be uniformly moved in a controlled manner in the X and/or Y direction. The conductors and leads required for controlling and powering the moving means 120 may also be routed across the substrate and across the substrate strips. Moving means 120 may in particular take the form of EAP actuators. The EAP actuators are preferably helical or spring-like in shape so as to allow for both expansion and contraction thereof.

Figure 2:
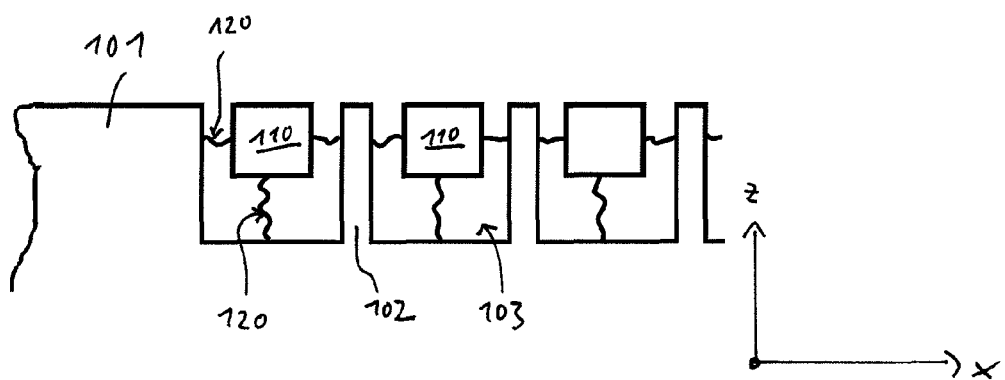
FIG. 2 is a cross-sectional view of the embodiment shown in FIG. 1.

FIG. 2 shows image sensor 100 of FIG. 1 in cross-sectional view. As shown therein, the individual light-sensitive cells 110 can be attached to substrate 101 also via moving means 120 extending in the Z direction. In order to avoid tilting, it is also possible to provide a plurality of moving means 120 extending in the Z direction. Moving means 120 extending in the Z direction are provided to counteract vibration in the Z direction by moving in this direction, in particular to compensate for vibrations which negatively affect the sharpness of the captured image.

Depending on the requirements, it is possible to provide only the moving means for the XY movement, only the moving means for the Z movement, or both.

Moreover, for image stabilization purposes, vibration sensors (not shown), such as gyroscopes or acceleration sensors, are provided to detect vibrations in the X, Y and/or Z directions. The output signals of these sensors may be suitably processed, if required, and are used to control moving means 120 and to counteract the detected movement or vibration.

Figure 3:
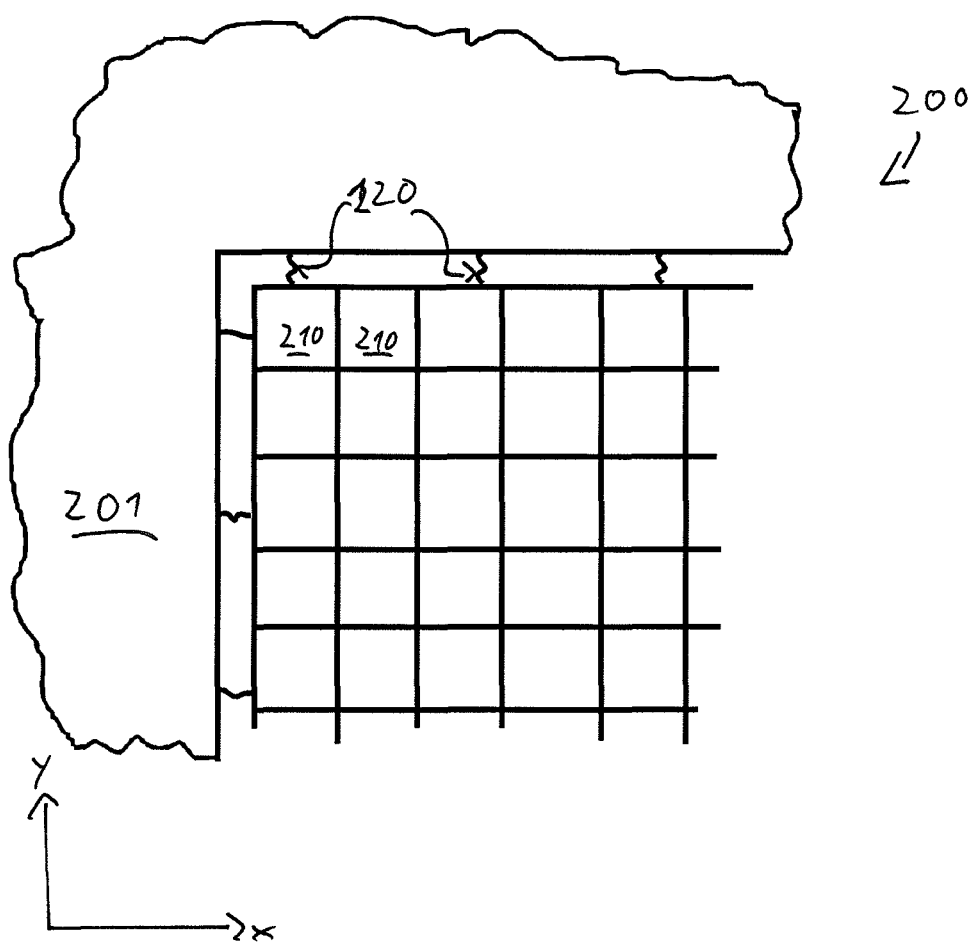
FIG. 3 is a schematic top view of a second preferred embodiment of an image stabilization device according to the present invention.

FIG. 3 shows, in a schematic top view, a second preferred embodiment of an image stabilization and capture device 200 according to the present invention. Image stabilization and capture device 200 also takes the form of an image-stabilized, optoelectronic image sensor, for example a CCD image sensor or a CMOS image sensor. Image sensor 200 includes a substrate 201 and a number of light-sensitive cells 210, which are arranged in an array and, in the present example, are located on a continuous surface. As is known to those skilled in the art, there are various types of such light-sensitive surfaces. Such light-sensitive surfaces may be provided with what is known as "shift registers" and the like, which may possibly also be disposed between individual light-sensitive cells. The continuous surface as a whole is attached by moving means 220 to the surrounding substrate 201, which defines a stationary spatial reference. The embodiment 200 of FIG. 3 may also have moving means (not shown) for the Z direction, in particular to compensate for vibrations which negatively affect the sharpness of the captured image.

Figure 4:
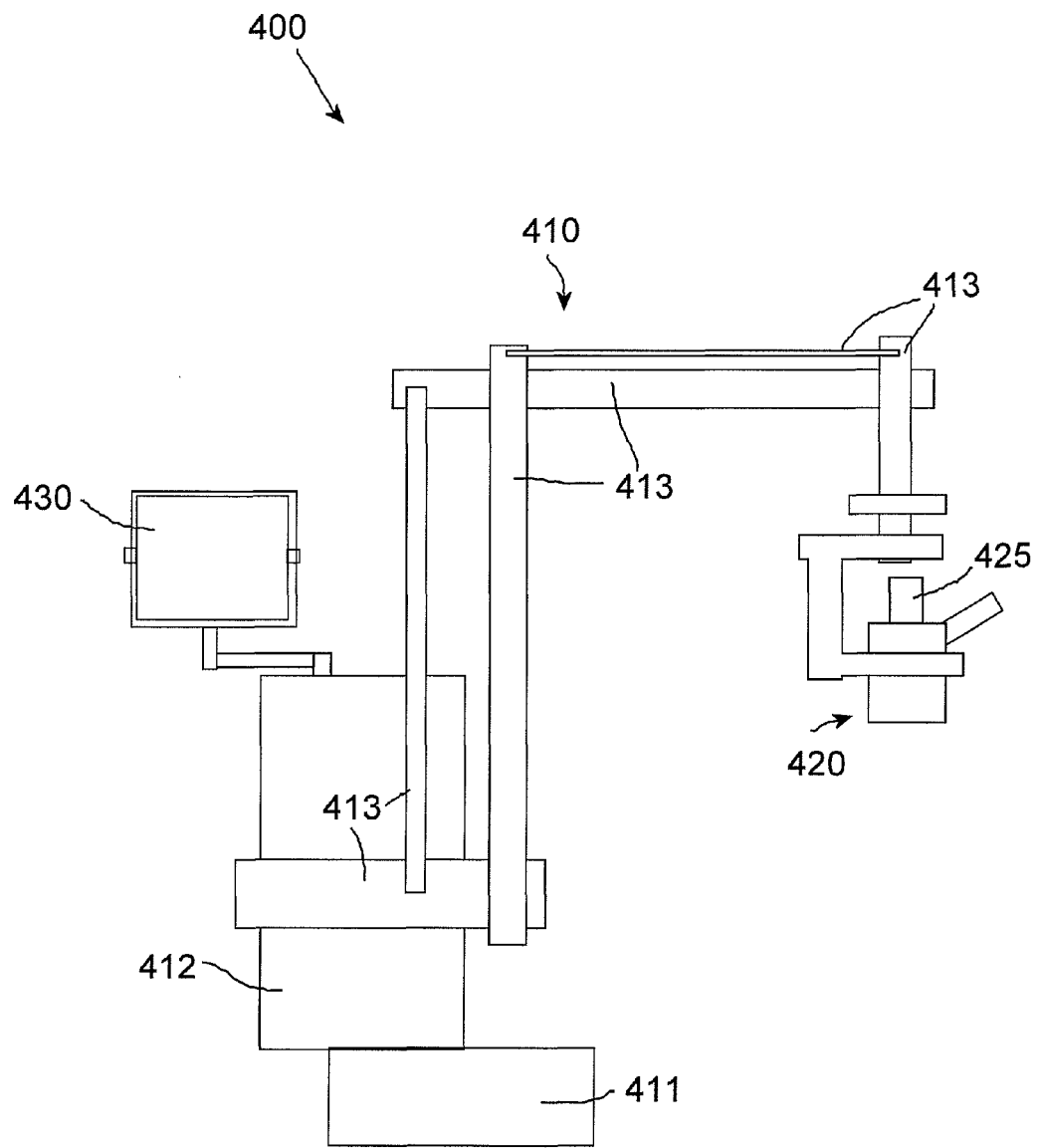
FIG. 4 is a schematic view of a preferred embodiment of a surgical microscope according to the present invention, shown mounted on a stand.

In FIG. 4, a microscope system is shown in schematic view and denoted as a whole by 400. Microscope system 400 includes a preferred embodiment of a surgical microscope 420 according to the present invention, which is supported by and movably mounted on a stand 410.

Stand 410 includes a base 411 on which is rotatably mounted a body 412. The stand further includes a number of arms 413, which carry surgical microscope 420 and allow it to be moved in space. Body 412 accommodates, inter alia, power supply devices (not shown) and the like, as well as a control unit of the microscope system.

Surgical microscope 420 is equipped with an image capture system 425 having an image stabilization and capture device, such as has been described, for example, with reference to FIGS. 1 through 3. A video screen 430 is provided, inter alia, for displaying the images captured by image capture system 425. Video screen 430 is also used to display, for example, settings of microscope system 400.

Using the approach according to the present invention, a surgical microscope can be equipped with a particularly space-efficient image stabilization and capture device for compensating vibrations, etc.

Although the present invention has been described with respect to one or more particular embodiments, it will be understood that other embodiments of the present invention may be made without departing from the spirit and scope of the present invention.

What is claimed is:

1. An image stabilization and capture sensor, comprising:
   a plurality of optoelectronic image capturing cells (110; 210) arranged in a matrix array;
   a carrier substrate (101, 102; 201) defining a sensor plane and being adapted for supporting, and electrically contacting, the optoelectronic image capturing cells (110; 210) and for connecting the image stabilization and capture sensor to further elements; and
   at least one moving means (120; 220) for moving the plurality optoelectronic image capturing cells (110; 210) relative to the carrier substrate (101, 102; 201);
   wherein at least one of the plurality of optoelectronic image capturing cells (110) is supported separately from other optoelectronic image capturing cells (110) by the at least one moving means (120) so that the at least one of the plurality of optoelectronic image capturing cells (110) can move relative to the carrier substrate (101, 102) and relative to another of the plurality of optoelectronic image capturing cells (11).

2. The image stabilization and capture sensor as recited in claim 1, wherein the carrier substrate (101, 102) includes a grid-shaped portion having horizontal and vertical strips (102) between adjacent optoelectronic image capturing cells (11); and
   at least one of the plurality of optoelectronic image capturing cells (110) is attached to at least one horizontal and at least one vertical strip (102) of the carrier substrate by at least one respective moving means (12).

3. The image stabilization and capture sensor as recited in claim 1, wherein the plurality of optoelectronic image capturing cells (210) are located on a continuous surface and, as a whole, are held by the at least one moving means (220) in such a way that the plurality of optoelectronic image capturing cells (210) can move relative to the carrier substrate (201).

4. The image stabilization and capture sensor as recited in claim 1, wherein the at least one moving means (120; 220) includes a micromechanical device, an electroactive polymer, a piezoelectric actuator, a thermal actuator and/or a capacitive actuator.

5. The image stabilization and capture sensor as recited in claim 1, wherein the at least one moving means (120; 220) is adapted to move the optoelectronic image capturing cells (110; 210) in the sensor plane.

6. The image stabilization and capture sensor as recited in claim 1, wherein the at least one moving means (120; 220) is adapted to move the optoelectronic image capturing cells (110; 210) in a direction perpendicular to the sensor plane.

7. The image stabilization and capture sensor as recited in claim 1, further comprising at least one acceleration sensor for sensing acceleration in a sensing direction in the sensor plane and/or perpendicular to the sensor plane, said sensor being connected to the at least one moving means (120; 220);
wherein an output signal of the at least one acceleration sensor is used to drive the at least one moving means (120; 220) in a direction corresponding to the sensing direction of the sensor.

8. An image capture system (425), comprising:
a housing accommodating an image stabilization and capture sensor (100; 200), comprising:
a carrier substrate (101, 102; 201) defining a sensor plane;
a plurality of optoelectronic image capturing cells (110; 210) arranged in an array; and
at least one moving means (120; 220) for moving the plurality optoelectronic image capturing cells (110; 210) relative to the carrier substrate (101, 102; 201);
wherein at least one of the plurality of optoelectronic image capturing cells (110) is supported separately from other optoelectronic image capturing cells (110) by the at least one moving means (120) so that the at least one of the plurality of optoelectronic image capturing cells (110) can move relative to the carrier substrate (101, 102) and relative to another of the plurality of optoelectronic image capturing cells (11).

9. A surgical microscope (420), comprising:
an image capture system (425), comprising:
a housing accommodating an image stabilization and capture sensor (100; 200), comprising:
a carrier substrate (101, 102; 201) defining a sensor plane;
a plurality of optoelectronic image capturing cells (110; 210) arranged in an array; and
at least one moving means (120; 220) for moving the plurality optoelectronic image capturing cells (110; 210) relative to the carrier substrate (101, 102; 201);
wherein at least one of the plurality of optoelectronic image capturing cells (110) is supported separately from other optoelectronic image capturing cells (110) by the at least one moving means (120) so that the at least one of the plurality of optoelectronic image capturing cells (110) can move relative to the carrier substrate (101, 102) and relative to another of the plurality of optoelectronic image capturing cells (11).

\* \* \* \* \*